(No Model.)

A. W. NIBŒLIUS.
MASH BOILER.

No. 300,113. Patented June 10, 1884.

Witnesses:
Evard Arfelt
Rob't W. Matthews

Inventor:
Axel W. Nibalius
by A. W. Almqvist
Attorney.

UNITED STATES PATENT OFFICE.

AXEL W. NIBŒLIUS, OF BROOKLYN, NEW YORK.

MASH-BOILER.

SPECIFICATION forming part of Letters Patent No. 300,113, dated June 10, 1884.

Application filed January 6, 1883. (No model.)

*To all whom it may concern:*

Be it known that I, AXEL W. NIBŒLIUS, a citizen of Sweden, and a resident of Brooklyn, in the county of Kings and State of New York, have invented certain new and useful Improvements in Mash-Boilers, of which the following is a specification.

The object of my invention is to provide an improved apparatus by which grain of any kind, as well as potatoes, may be more completely mashed than heretofore, or reduced, by boiling with high pressure and temperature, to a fine, pulpy, liquid state, in which the starch is dissolved as completely as possible, and much more so than heretofore, before it is mixed with the malt, the diastase of which completes its solution, changing it into grape-sugar, which afterward, by the process of fermentation, is broken up into alcohol and carbonic acid in the usual manner. As malt will not stand a higher temperature than about 62° (centigrade) without being destroyed, and starch will not gradually dissolve except at very high temperature, the advantage will be readily seen of means whereby the solution of the starch is almost completely effected before it is acted on by the diastase of the malt. The object is further to provide such construction of the said apparatus that the said complete disintegration of the grain, &c., and the liberation of its starch from the scales or bran and its conversion into soluble or liquid form may be effected with much larger quantities of grain than could be accomplished with apparatus as heretofore constructed.

Figure 1:
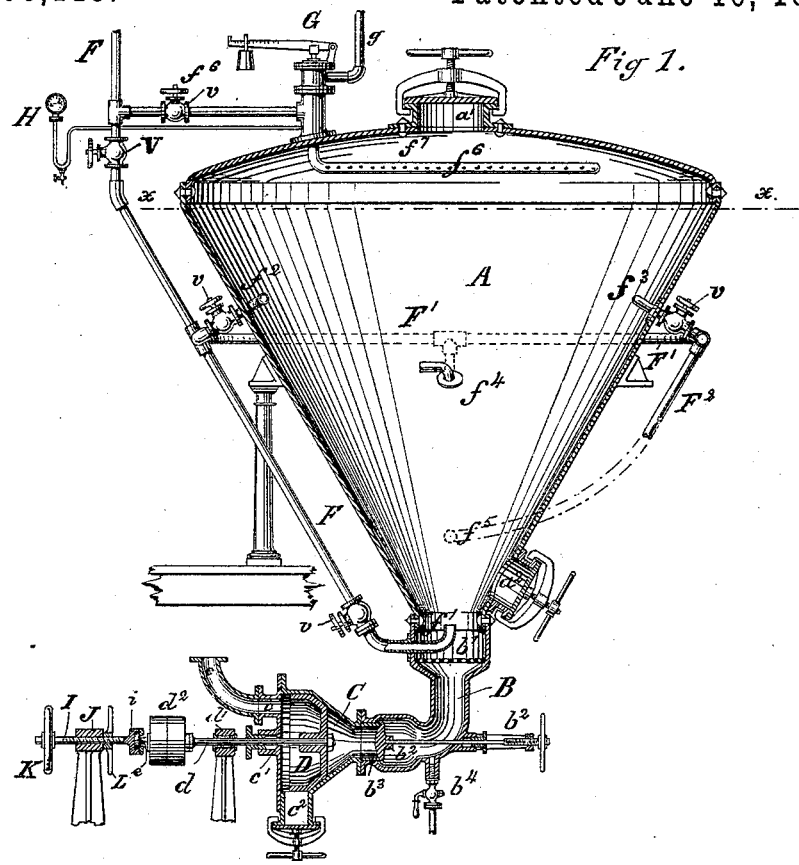
Figure 2:
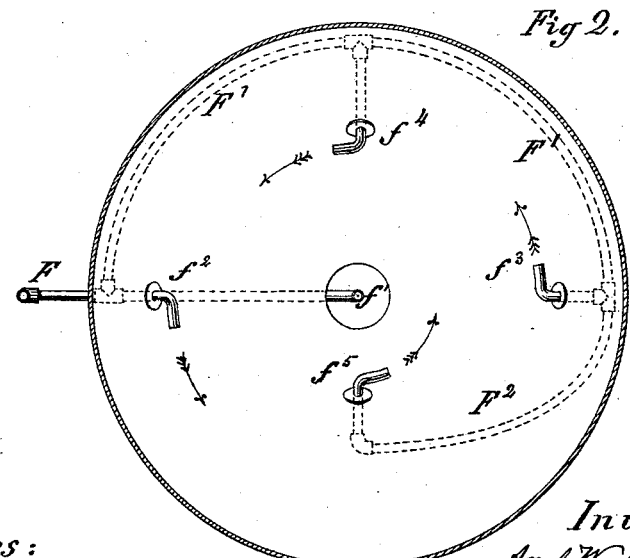

In the accompanying drawings, Figure 1 represents a vertical section of my improved mash-boiler. Fig. 2 is a horizontal section of the same, taken on the line $x\ x$ of Fig. 1.

A is the boiler proper, being a closed vessel of the shape of an inverted cone provided on the top with a charge-opening or man-hole, $a'$, and at its lower end or apex with a man-hole, $a^2$, for cleaning purposes. The lower end of the cone is riveted to the enlarged upper end of the vertical portion of an elbow pipe or casting, B, whose horizontal branch has also an enlargement, in which is fitted a screw-valve or check-valve, $b^2$, the latter having its seat against the inner end of a ring, sleeve, or nipple, $b^3$, fitted in a contraction of the end of the said horizontal enlargement of the elbow-pipe B, as shown in Fig. 1.

In the lower end of the upper enlargement of the elbow-pipe B is fitted a screen or fine grate, $b'$, and in the bend of the elbow is a vertical draw-off-pipe, $b^4$, provided with a stop-cock.

C is a partly conical and partly cylindrical vessel bolted to the end flange of the horizontal arm of the elbow-pipe B, and is provided in line with the stem of the valve $b^2$ with a stuffing-box, $c'$, in which and in suitable bearings, $d'$, is supported a shaft, $d$, on the inner end of which is secured a partly conical and partly cylindrical casting, D, fitting within the vessel C at the junction of the conical and cylindrical portion of the latter.

On the shaft $d$ are mounted fast and loose pulleys $d^2$, to which motion may be transmitted by belt from any suitable motor, to revolve or stop the revolution of the casting D within the vessel C, the said casting D, when revolving, acting as a grinder after the fashion of a grinding-mill. The outer end of the shaft $d$ has a head, $e$, which is swiveled in a jaw, $i$, upon the end of a rod, I, threaded through the bracket or bearing J, and provided at its outer end with a hand-wheel, K, by which the said rod I may be turned, and thus screwed forward and backward in its end bearing, J, to tighten or loosen the casting D in or from contact with the grinding-surface of the vessel C, or, as the term is, to "set the grinder."

In order to keep the threaded bar I from accidentally turning, the same is provided with a hand-wheel, L, tightening against the side of the bearing J.

In the lower cylindrical portion of the vessel C is a man-hole, $c^2$, by which access may be gained for cleaning and repairing. The front cover of the vessel C is provided above the stuffing-box $c'$ with a pipe, $c$, from which the ground contents of the boiler A are discharged into the mashing apparatus proper.

F is a steam-pipe, from which, by means of one or more circular branch pipes, F' F², and jet-openings $f'\ f^2\ f^3\ f^4\ f^5\ f^6$, steam is let in at various points of the cone A. V is the main valve in the pipe F. Each of the aforesaid jet-openings is provided with a shut-off valve or stop-cock, $v$. The pipe $f^6$ is made up of two parts, one of which is on the outside of the boiler, and is attached to the valve G at $h$. The other has perforations $b^7$, and extends within the boiler, and is attached to the same at the junction of the said valve G with the boiler. When the safety-valve G is open, steam from the boiler escapes by means of the said perforations $f^7$ to and through the pipe $g$. It will be seen that from the circular branch pipe F' the jet-openings $f^2 f^3$ enter the boiler at about equal height above the said branch pipe, and the jet-pipe $f^4$ enters the boiler below the said pipe F', while a downward-projecting branch, F², enters the lower end of the boiler by the jet-pipe $f^5$.

As shown in the drawings, especially in Fig. 2, the inner ends of the jet-pipes are curved to circles concentric to the surface of the cone, and the steam issues from them in the direction indicated by the arrows, while the jet-pipe $f'$ (or two or more such pipes) discharges its steam from the lower end of the boiler vertically upward in the axis of the cone, the combined effect of all this being to keep the grain in constant commotion and agitation, submitting every portion thereof to the action and impact of the steam.

H is a pressure gage or manometer.

The operation is as follows: The valves $b^2 b^4 v$, as well as the man-holes $a^2 c^2$ being closed, the requisite quantities of grain and water are fed into the boiler through the upper man-hole, $a'$, which is then closed. The inlet-valve of the pipe $f^6$ is then opened, allowing the steam to enter the boiler through the perforations $f^7$ until the water is caused to boil, after which the other valves, $v$, are gradually opened and the boiling allowed to continue under a pressure of from thirty to thirty-five pounds per square inch, observable by the manometer H. The safety-valve G is then weighted just sufficiently to allow a portion of the steam to constantly escape through the pipe $g$. This is done for the purpose of bringing the mass of grain in lively agitation by the constant supply of steam of high pressure, in order that every grain may get in contact with the steam, which issues vertically through the pipe $f'$ and horizontally through the pipes $f^2 f^5$. By this distribution of steam and the conical shape of the boiler it is impossible for any grain therein to remain at rest; but every particle thereof is brought to the action of the steam, and thus caused to dissolve in such a way that the starch separates completely from the shell or bran, and besides, through the action of the high steam-pressure, is brought into its soluble form. This is the main principle for the preparation of starch for mashing with malt and its transformation into grape-sugar and (by fermentation) into alcohol. By this means the starch in grains of all kinds, rice and potatoes, &c., is thus prepared in a manner to utilize a greater percentage of the starch than has been done by means heretofore known.

It is evident that by using two or more or a series of pipes, such as F', and jets entering therefrom by various points of the boiler, the latter may be made very wide at its upper end so long as it maintains its conical shape, and thus may be made to hold a much larger quantity of material than mash-boilers as heretofore constructed. This fact will be still more clearly understood when taking into consideration that cones of the same height are to each other as the squares of the diameters of the bases. When the steam-pressure has for a while remained at thirty to thirty-five pounds, the safety-valve is closed by loading it until the pressure of the steam has risen to between forty and fifty pounds. The grinder D is then put into rapid rotation, of, say, from three hundred to four hundred revolutions a minute. All the valves $f' f^5$ are then closed, and the valve $b^2$ gradually opened, so that the mass, broken up by boiling, is forced by high pressure through the rotating grinder D C and the discharge-pipe $c$ into the mashing apparatus proper, where it is mixed with the malt in the usual manner. The purpose of the mill D C is to crush and grind any seed which may have escaped disintegration in the boiling, and thus it reduces the mass to a uniform fineness. Small stones or other impurities accompanying the grains charged through the opening $a'$ are caught upon the screen $b'$, from whence they may afterward be removed by means of a man-hole, $a^2$, and such particles of stones, &c., as are small enough to fall through the screen $b'$ will pass through the mill, and, being crushed therein, may be caught and removed at and through the man-hole $c^2$, in which they will settle, while the liquid and material floating therein will pass out through the pipe $c$.

When it is desired to mash potatoes, or other starch-containing substances of looser texture than grain, (all the valves and the charge-opening A' being closed after filling the boiler with potatoes,) the valve in the pipe $f^6$ is opened, and steam of high pressure is allowed to enter the boiler through the perforations $f^7$. The high-pressure steam then drives out the so-called "fruit-water" or hygroscopic water contained in the potatoes, the said water escaping through the pipe $b^4$, the stop-cock of which is of course first opened for the purpose. The said water being thus got rid of, the valves of the pipes $b^4 f^6$ are again closed, and the process continued in the same manner as previously described. It is evident that this construction is equally adapted for dissolving other substances by steam of high pressure and temperature.

Having thus described my invention, I claim as new and desire to secure by Letters Patent—

1. In a mash-boiling apparatus, the combination, with the boiler A, of the steam-supply pipe F, stop-cocks $v$, the vertical jet bottom pipe $f'$, discharging a central jet, and perforated top pipe, $f^6$, and one or more branch pipes, F', and sub-branches F², provided with jet-pipes $f^2 f^3 f^4 f^5$, which enter the boiler at various elevations, and are bent to discharge the steam in the same circular direction, substantially as and for the purpose hereinbefore set forth.

2. The combination of a mash-boiler, provided with a grinding-mill, with a stone receptacle or trap, $c^2$, at the lowest point of said mill, and a discharge-pipe, $c$, at the upper part thereof, substantially as specified.

3. The elbow-pipe B, provided with the screen $b'$ and bottom discharge-pipe, $b^4$, in combination with the inverted-cone boiler A and valve $b^2\ b^3$, substantially as and for the purpose set forth.

In testimony that I claim the foregoing as my invention I have signed my name, in presence of two witnesses, this 2d day of January, 1883.

AXEL W. NIBŒLIUS.

Witnesses:
A. W. ALMQVIST,
EDVARD ARFELT.